United States Patent
Bedrine et al.

(10) Patent No.: US 11,852,023 B2
(45) Date of Patent: Dec. 26, 2023

(54) METHOD FOR QUICKLY STOPPING THE ROTOR OF A HELICOPTER AFTER LANDING

(71) Applicant: SAFRAN HELICOPTER ENGINES, Bordes (FR)

(72) Inventors: Olivier Bedrine, Moissy-Cramayel (FR); Jean Michel Frédéric Louis Bazet, Moissy-Cramayel (FR); David Cazaux, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 1 day.

(21) Appl. No.: 17/754,885

(22) PCT Filed: Oct. 14, 2020

(86) PCT No.: PCT/FR2020/051826
§ 371 (c)(1),
(2) Date: Apr. 14, 2022

(87) PCT Pub. No.: WO2021/074531
PCT Pub. Date: Apr. 22, 2021

(65) Prior Publication Data
US 2023/0193779 A1 Jun. 22, 2023

(30) Foreign Application Priority Data
Oct. 17, 2019 (FR) ...................................... 1911630

(51) Int. Cl.
*F01D 21/12* (2006.01)
*F02C 7/25* (2006.01)
(52) U.S. Cl.
CPC ................ *F01D 21/12* (2013.01); *F02C 7/25* (2013.01); *F05D 2220/329* (2013.01); *F05D 2270/09* (2013.01)

(58) Field of Classification Search
None
See application file for complete search history.

(56) References Cited

U.S. PATENT DOCUMENTS 4,738,098 A 4/1988 McMahon

FOREIGN PATENT DOCUMENTS

| EP | 3075662 A1 | 10/2016 |
| EP | 3211184 A1 | 8/2017 |

(Continued)

OTHER PUBLICATIONS

Ferrand "High Fidelity Modeling of the Acceleration of a Turboshaft Engine During a Restart" (Year: 2018).*

(Continued)

*Primary Examiner* — Arun Goyal
*Assistant Examiner* — William L Breazeal
(74) *Attorney, Agent, or Firm* — Bookoff McAndrews, PLLC (57) ABSTRACT

A method for quickly stopping the propulsion rotor of a helicopter after landing, comprising, following a request for quickly stopping the engine by a helicopter pilot, the following steps managed by the control unit of the turbomachine: Detecting the absence of the thermal stabilization phase of the gas generator of at least one turbomachine, controlling an extinction of the combustion chamber of the gas generator of at least one turbomachine, maintaining the rotation of the gas generator of which the combustion chamber is extinguished by means of said at least one electrical machine to ventilate the gas generator and stopping the main rotor of the helicopter by means of a mechanical brake.

20 Claims, 4 Drawing Sheets

(56) References Cited

FOREIGN PATENT DOCUMENTS

EP         3204618 B1    9/2018
WO    2016055738 A1    4/2016

OTHER PUBLICATIONS

French Search Report issued in French Application FR1911630 dated Jun. 22, 2020 (2 pages).
International Search Report and Written Opinion issued in International Application PCT/FR2020/051826 dated Jan. 13, 2021 (8 pages).

* cited by examiner

METHOD FOR QUICKLY STOPPING THE ROTOR OF A HELICOPTER AFTER LANDING

CROSS-REFERENCE TO RELATED APPLICATION(S)

This application is a National Stage Application of International Application PCT/FR2020/051826, filed on Oct. 14, 2020, now published as WO 2021/074531 A1, and which claims priority to French patent application FR1911630, filed on Oct. 17, 2019, which is incorporated by reference herein in its entirety.

TECHNICAL FIELD

The present invention relates to the general field of helicopter turbomachines and more particularly the method for quickly stopping the main rotor, i.e. the rotor providing propulsion of a helicopter, after landing.

PRIOR ART

In the different flight phases of a helicopter, the landing phase generally comprises a stationary phase which requires disposing of a high power at the turbomachine(s) forming the engines of the helicopter.

After this landing phase, the pilots seek to quickly stop the main rotor of the helicopter in order to be able to disembark passengers or wounded.

As the engines, or the engine in the case of a single-engine helicopter, have been used at high power settings, a sudden stop is detrimental to the engine. To avoid damaging the engine, it is normal to indicate to the pilots to observe a thermal stabilization phase at a so-called idle speed for several minutes to protect themselves in particular against mechanical stresses, such as differential dilation, or coking of the oil, which are linked to strong variations in power demand. There exists, in fact, a risk that the oil or the fuel of the engine will coke at the hot portions of the engine, for example at the fuel injectors in the combustion chamber of the engine.

The duration of this thermal stabilization phase is generally predefined depending on the type of engine and is typically comprised between 30 seconds and 2 minutes.

This waiting time can be particularly critical when a fast helicopter is involved, the goal of which is to be able to quickly accomplish a given mission and therefore limit downtime.

Turbomachines installed on helicopters are generally of the free turbine type, i.e. they comprise a gas generator and a turbine not mechanically connected to the gas generator. The free turbine allows supplying mechanical power to the rotor of the helicopter via a main gearbox. A gas generator comprises a compressor, a combustion chamber, and a turbine mechanically linked to the compressor by a shaft common to the rotating parts of the turbine and of the compressor. The free turbine, located downstream of the turbine of the gas generator, is mechanically independent of the shaft of the gas generator.

But as long as the engine of the free turbine type is held at idle, the gases of the gas generator exert a certain power on the free turbine, and therefore a torque on the rotor via the power gearbox. This involves high mechanical stresses in the dimensioning of the brake which, to brake the rotor, must counteract the torque supplied by the residual power of the free turbine.

In addition to the solution of stopping the rotor consisting of stabilizing the engine at idle once on the ground during, at most, 2 minutes, a second solution which can be contemplated but not accomplished would consist of blocking the free turbine by means of a brake by positioning the engine at an idle speed sufficiently low to minimize the brake torque. The use of a brake after landing allows thermally stabilizing the engine and quickly blocking the rotor. Its dimensioning, however, remains delicate because it allows counteracting the residual power of the free turbine and braking the rotor.

This solution may possible satisfy a single-engine application, but has a great impact for two-engine installations. In fact, the brake must be dimensioned to brake the rotor and block both free turbines. This type of dimensioning risks excessively impacting the bulk and the mass of the brake.

DISCLOSURE OF THE INVENTION

To this end, the present invention proposes a method for quickly stopping the rotor allowing in particular no long supplying power to the rotor starting at landing and thus be able to quickly stop it while retaining a thermal stabilization phase of the gas generator of the turbomachine(s).

In one object of the invention, a method for quickly stopping the main rotor, i.e. of the propulsion and/or lifting rotor of a helicopter, after landing is proposed. The helicopter comprises a main rotor for the propulsion of the helicopter, at least one turbomachine, a main gearbox, a turbomachine control unit, and electrical power supply network, and at least one electrical machine coupled to the electrical network, said at least one turbomachine including a gas generator equipped with a mechanical shaft, a free turbine coupled to the main rotor via the main gearbox and mechanically independent of the mechanical shaft of the gas generator, and a system configured to mechanically couple an electrical machine to the gas generator.

According to a general feature of the invention, the method comprises, following a step of requesting the quick stop of the engine by a helicopter pilot causing the extinction of the combustion chamber of the gas generator of at least one turbomachine, the following steps:

detecting the absence of a thermal stabilization phase of the gas generator of at least one turbomachine to confirm that to confirm that the request for stopping the engine is a request for quickly stopping the main rotor,
  in the event of absence of the thermal stabilization phase, maintaining rotation of the gas generator for each turbomachine of which the combustion chamber is extinguished by means of said at least one electrical machine mechanically coupled to the gas generator and powered by the electrical network to continue to ventilate the gas generator when stopped when the helicopter pilot decides to quickly stop the rotor, and
  stopping the main rotor of the helicopter by means of a brake.

Stopping the engines of the helicopter, i.e. the application of zero power on the free turbine and the extinction of the combustion chamber, coupled with the use of a brake solely dimensioned to brake the propulsion rotor, allows the pilot to quickly dispose of a rotor at zero speed and thus offers the pilot a better operational capacity to quickly accomplish a given mission, for example disembarking and/or passengers.

The ventilation of the gas generator is thus accomplished based on electrical machines already existing on the turbomachine, without impacting the speed of the rotor of the helicopter because the free turbine is not driven, and without its activation requiring an action by the pilot. In addition, the ventilation of the gas generator is all the more effective because the combustion chamber is extinguished.

The duration of the ventilation can be several minutes and allows limiting for example the risks of blocking the rotors or the coking of the bearing lubricant. In the case of a multi-engined helicopter, i.e. equipped with at least two turbomachines, the engines must be ventilated simultaneously.

In a first aspect of the method for quickly stopping the helicopter rotor, the rotation of the extinguished gas generator by said at least one electrical machine can be maintained for a predefined ventilation period starting with the extinction of the combustion chamber, and the power supply of the electrical machine can be stopped at the end of the ventilation period.

In a second aspect of the method for quickly stopping the helicopter rotor, the rotation of the extinguished gas generator by said at least one electrical machine can be maintained as long as at least one measured temperature of the gas generator is greater than a first threshold and/or the absolute value of a measured temperature gradient is greater than a second threshold.

In one aspect, the rotation of the extinguished gas generator can thus be maintained for a predefined ventilation period, but shut off before the expiration of this ventilation period as soon as the measured temperature of the gas generator is less than the first threshold.

In a third aspect of the method for quickly stopping the helicopter rotor, the electrical network of the helicopter can also be power supplied by at least one alternator driven by the auxiliary power unit (APU).

The electrical network then being powered by at least one auxiliary power unit, the energy necessary for powering said at least one electrical machine for the ventilation of the gas generator of said at least one turbomachine can originate with an alternator driven by an auxiliary power unit as well as, possibly, at least one battery.

The power of the electrical machines by an auxiliary power unit during the thermal stabilization phase following a landing can also allow retaining sufficient electrical energy in at least one battery for an emergency takeoff.

In a fourth aspect of the method for quickly stopping the helicopter rotor, in which the helicopter comprises at least two turbomachines each having a free turbine connected to the main rotor via the main gearbox, the method can also comprise, prior to the step of requesting the quick stop of the engine, a step of requesting operation in an auxiliary power unit mode of at least one turbomachine driving the following steps managed by the control unit of the turbomachine:
  increasing the torque of at least one turbomachine until at least one other turbomachine supplies a zero torque to the main gearbox,
  disengaging said at least one turbomachine supplying a zero torque, and
  operating in auxiliary power unit mode said at least one disengaged turbomachine to power supply the electrical network of the helicopter.

The step of requesting the quick stop of the engine by the helicopter pilot causes the extinction of the combustion chamber of the gas generator of each turbomachine still engaged to the main gearbox, and the step of detecting the absence of the thermal stabilization phase is applied to the gas generator of each turbomachine still engaged to the main gearbox.

This fourth aspect of the method allows both extinguishing each turbomachine still engaged while continuing to ventilate it while stopped, and using a disengaged turbomachine as an auxiliary power unit to power the electrical machine intended to ventilate the gas generator of an extinguished turbomachine, during the thermal stabilization phase, and thus not draw from the batteries the electrical energy necessary for this power. A turbomachine used as an auxiliary power unit can still operate its thermal stabilization normally because it supplies only a little power.

In a fifth aspect of the method for quickly stopping the helicopter rotor, the step of requesting operation in auxiliary power unit mode of at least one turbomachine is requested by the pilot of the helicopter prior to the step of requesting the quick stop of the engine, and information on the actual operation in auxiliary power unit mode of at least one turbomachine is transmitted to the pilot prior to his request for quickly stopping the engine.

In a sixth aspect of the method for quickly stopping the helicopter rotor, the electrical network of the helicopter can be configured to be power supplied by at least one alternator driven by an auxiliary power unit (APU).

In a seventh aspect of the method for quickly stopping the helicopter rotor, the electrical network of the helicopter can comprise at least one battery of the electrical network powering said electrical machine.

DESCRIPTION OF EMBODIMENTS

Figure 1:
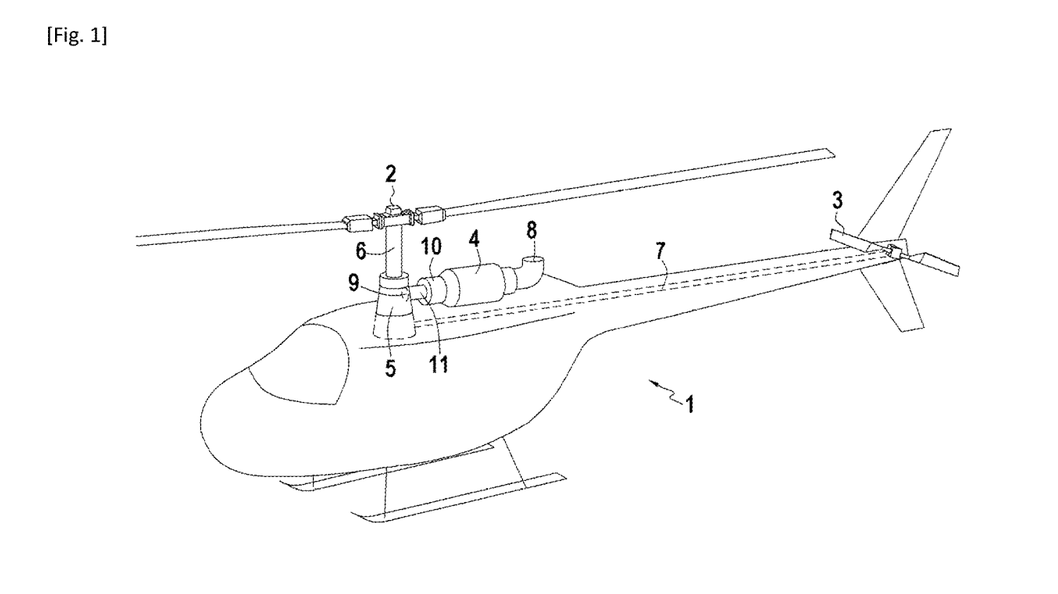
FIG. 1 is a simplified schematic view of a helicopter propulsion assembly with a main gearbox according to the prior art.

A propulsion assembly of a helicopter 1 with a main gearbox according to the prior art is presented schematically in FIG. 1.

The helicopter 1 is equipped with a main rotor 2, for lift and propulsion, as well as an anti-torque rotor. In the example illustrated in FIG. 1, the anti-torque rotor is a tail rotor 3 but it could be a rotor coaxial with the main rotor. The drive train of the helicopter comprises in particular a turbomachine 4 to supply the power necessary for the flight of the helicopter and a main gearbox 5 the function of which is to transmit the power of the turbomachine 4 to the main rotor 2 and to the tail rotor 3 to set them in motion by mechanisms which are schematically shown in FIG. 1 by a first shaft 6 mechanically coupled to the main rotor 2 and a second shaft 7 mechanically coupled to the tail rotor 3. The turbomachine 4 is shown here with its exhaust 8.

Generally, the main gearbox 5 includes a mechanical input 9 from which the inner gears are driven which actuate the shafts 6 and 7 respectively coupled to the main rotor 2 and to the tail rotor 3.

Generally too, the turbomachine includes a mechanical output 10, which can be a first series of gears reducing the number of revolutions, coupled to the mechanical input 9 of the main gearbox 5 by a third shaft 11.

Figure 2:
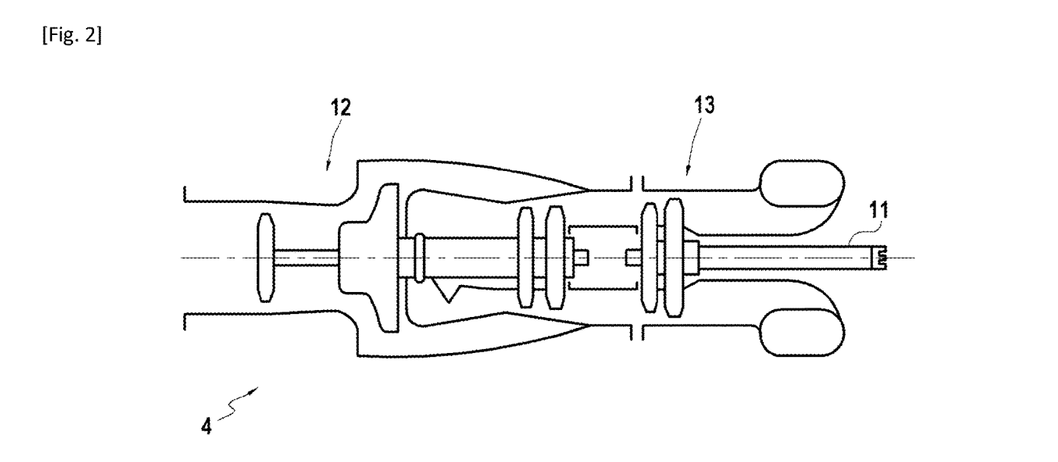
FIG. 2 is a schematic section view of a turbomachine with a free turbine according to the prior art.

A section view of a turbomachine 4 with a free turbine according to the prior art is shown schematically in FIG. 2. The turbomachine 4 comprises a gas generator 12 and a free turbine 13 to which the third shaft 11 is mechanically connected. As is known, the free turbine 13 is mechanically independent of the gas generator 12, in other words the third shaft 11 is not coupled to the shaft of the gas generator.

Figure 3:
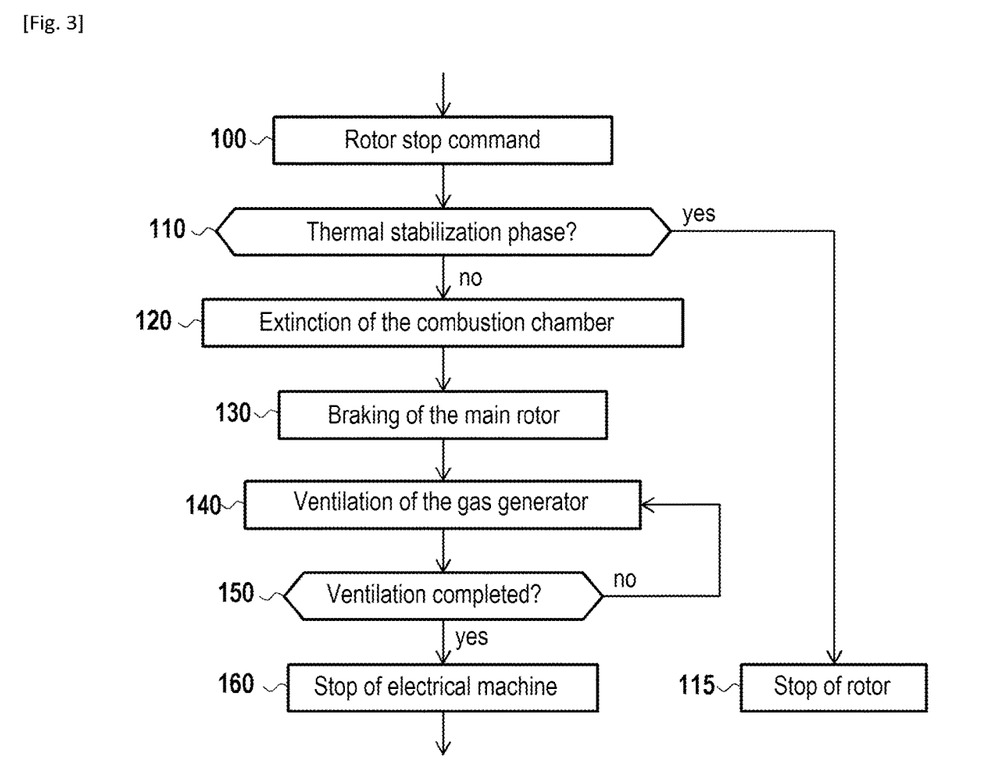
FIG. 3 shows a flowchart of a method for quickly stopping a main rotor of a helicopter according to a first embodiment.

In FIG. 3 is shown a flowchart of a method for quickly stopping a main rotor of a helicopter according to a first embodiment.

In this first embodiment, the helicopter 1 can comprise one turbomachine 4 or several turbomachines.

In a first step 100 of the method, at the conclusion of a landing phase of the helicopter 1, the pilot issues a command to stop the engine in order to quickly accomplish a given mission such as for example disembarking or embarking passengers.

In a second step 110 of the method, an electronic control unit determines whether the thermal stabilization phase of the gas generator 12 of the turbomachine 4 has already taken place. If it has already taken place, in a step 115 the control unit transmits a signal to control the extinction of the gas generator 12, following which the pilot commands the stop of the main rotor 2 by the application of a brake on the shaft 6 of the main rotor 2.

If, on the other hand, no thermal stabilization phase is detected, the control unit commands the extinction of the combustion chamber of the gas generator 12 of the turbomachine 4 in a step 120, then the braking of the main rotor 2 in a step 130, and the ventilation of the gas generator 12 of the turbomachine in a step 140. The ventilation of the gas generator 12 is accomplished by the rotation of the gas generator 12 by an electrical machine which is powered by the electrical network of the helicopter. The electrical network of the helicopter can be coupled to one or more battery(ies), and possibly to at least one auxiliary power unit.

In a following step 150, the control unit verifies whether the ventilation of the gas generator 12 is completed. As long as it is not completed, the method repeats the steps 140 and 150.

Once the ventilation of the gas generator is completed, the control unit commands, in a step 160, a cut-off of the power supply of the electrical machine rotating the gas generator 12.

Figure 4:
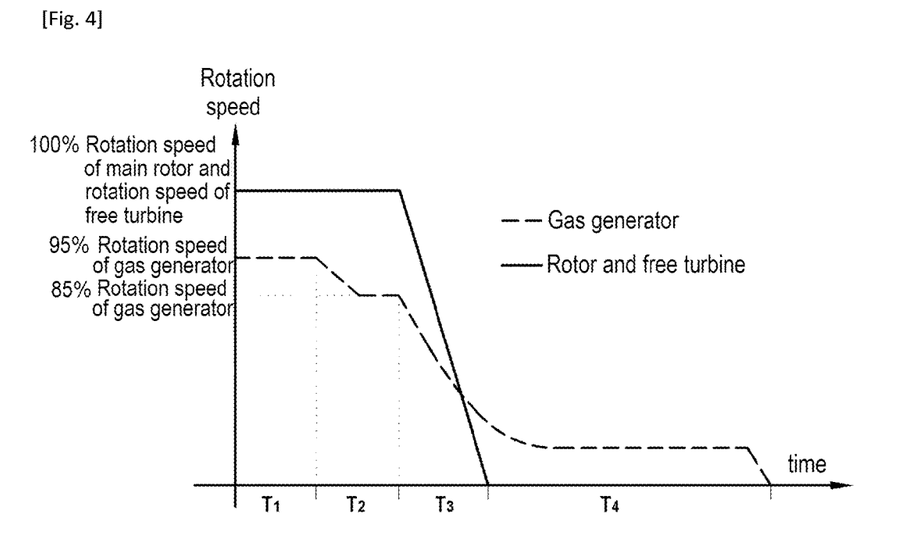
FIG. 4 shows a first graph of the evolution over time of the rotation speeds of the rotor and of the gas generator during the application of the stopping method of FIG. 4.

With a method of this type, an evolution over time is thus obtained of the rotation speeds of the rotor and of the free turbine in solid lines, and of the gas generator in dotted lines as shown in the graph illustrated in FIG. 4.

During a first phase $T_1$, the helicopter lands and uses the power of the turbomachines. After landing, in a second phase $T_2$, the pilot lowers the pitch of the rotor, consequently reducing the power delivered by the turbomachines to the minimum needed to maintain the speed of the main rotor 2. Then, in a third phase $T_3$, following the command to stop the engine actuated by the pilot, the speed of the rotor decreases quickly until it is totally stopped, and the rotation speed of the generator also drops. Following the stop of the rotor, in a fourth phase $T_4$, the rotation speed of the gas generator 12 is brought to, then maintained at a ventilation speed threshold. Once the ventilation is completed, the electrical machine rotating the gas generator 12 during the ventilation phase is stopped, and the rotation speed of the gas generator 12 decreases very quickly until zero speed is reached.

Figure 5:
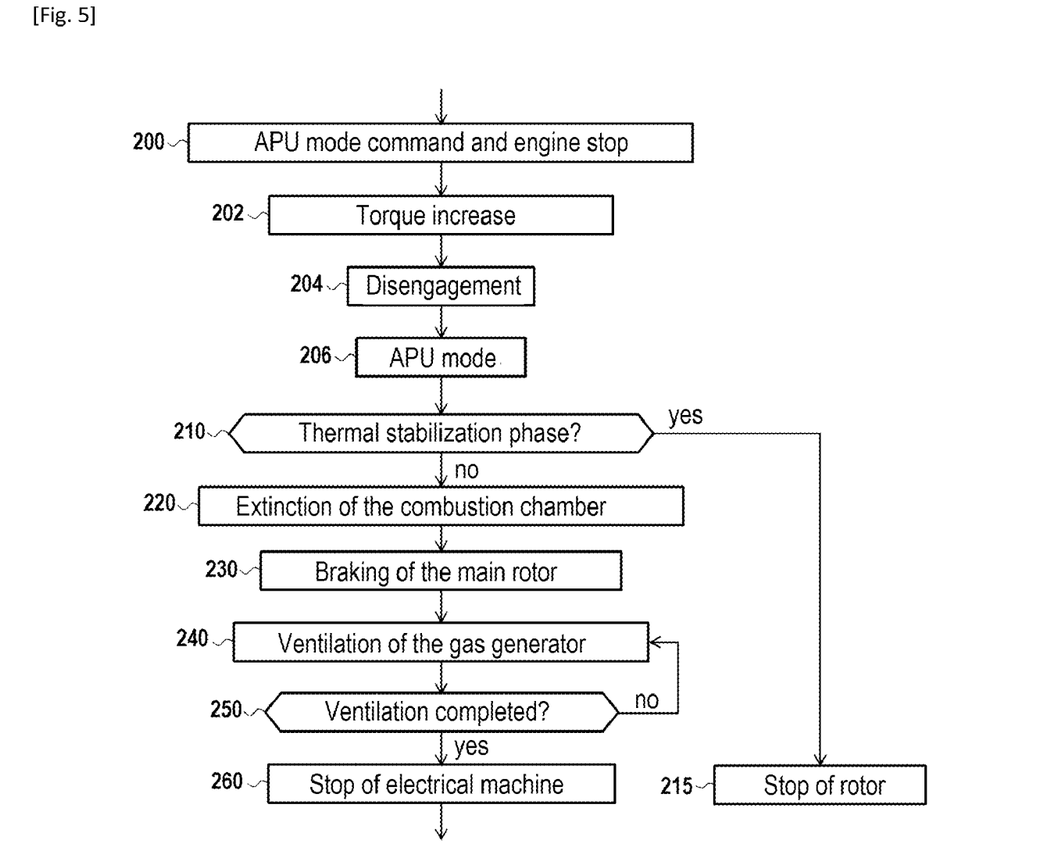
FIG. 5 shows a flowchart of a method for quickly stopping a main rotor of a helicopter according to a second embodiment.

Shown in FIG. 5 is a flowchart of a method for quickly stopping a main rotor of a helicopter according to a second embodiment.

In this second embodiment, the helicopter 1 comprises at least two turbomachines 4.

In a first step 200 of the method, following a landing phase of the helicopter 1, the pilot issues a request for operation in auxiliary power unit mode of one of the two turbomachines and a command for stopping the other engine to be able to quickly accomplish a given mission such as for example disembarking or embarking passengers.

In one alternative, the request for transition into the APU mode could be generated by the control unit upon receiving a command for a quick stop without there being any thermal transition.

In a step 212, the torque of at least one turbomachine is increased until at least one other turbomachine supplies zero torque to the main gearbox 5. Then, in a following step 214, the control unit commands a disengagement of the turbomachine or of the turbomachines supplying a zero torque, and activates in a step 216 an operation of the turbomachine or of the turbomachines thus disengaged in an operation of production of electrical energy, called auxiliary power unit, to power supply the electrical network of the helicopter 1.

In a second step 210 of the method, an electronic control unit determines whether a thermal stabilization phase has already occurred, i.e. whether the turbomachine is thermally stabilized. If it has already occurred, the control unit commands the stop of the turbomachine and the stop of the rotor by the application of a brake to the shaft 6 off the main rotor in a step 215.

If, on the contrary, no thermal stabilization phase is detected, the control unit commands, in a step 220, the extinction of the combustion chamber of the gas generator 12 of at least one of the turbomachines 4 that are still engaged, then the braking of the main rotor 2 in a step 230. And, in a step 240, it commands the ventilation of the gas generator 12 of said at least one turbomachine 4 that is still engaged and the combustion chamber of which is extinguished. The ventilation of the gas generator 12 is accomplished by the rotation of the gas generator 12 by an electrical machine which is powered by the electrical network of the helicopter, and therefore by at least one disengaged turbomachine operating in an auxiliary power unit mode.

In a subsequent step 250, the control unit verifies whether the ventilation of the gas generator 12 is completed. As long as it is not completed, the method repeats the steps 240 and 250.

Once the ventilation of the gas generator is completed, the control unit commands, in a step 260, a cut-off of the power supply of the electrical machine rotating the gas generator 12.

Figure 6:
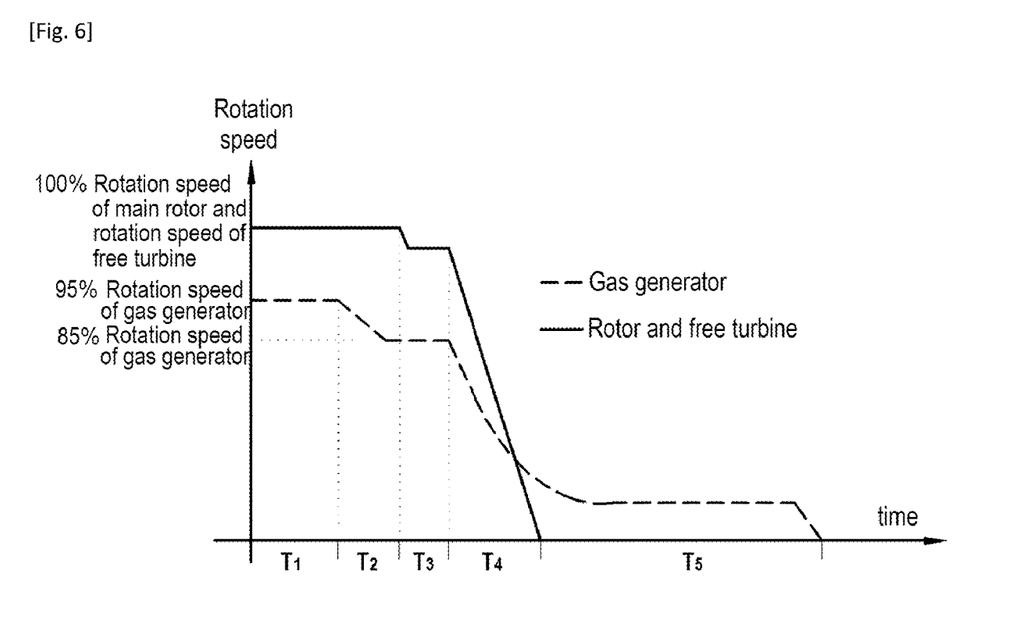
FIG. 6 presents a graph of the evolution over time of the rotation speeds of the rotor and of the gas generator during the application of the stopping method of FIG. 5.

With a method of this type, an evolution over time of the rotation speeds of the rotor of the free turbine in solid lines, and of the gas generator in dotted lines is thus obtained, as shown in the graph illustrated in FIG. 6.

During a first phase $t_1$, the helicopter lands and uses the power of the turbomachines. After landing, in a second phase $t_2$, the pilot reduces the pitch of the rotor, consequently reducing the power delivered by the turbomachines to the minimum needed for maintaining the speed of the main rotor 2. Then, in a third phase $t_3$, the control unit accomplishes the steps 212 to 216 to select at least one of the turbomachines and transition it into an auxiliary power unit mode and command the stop of the engine that is still engaged.

Then, in a fourth phase, the combustion chamber of at least one of the turbomachines that are still engaged is extinguished and the rotation speed of the generator drops. The main rotor is braked, which causes a drop in the speed of the main rotor 2 until it is totally stopped.

Following the stop of the rotor, in a fourth phase $t_4$, the rotation speed of the gas generator 12 is brought to, then maintained at a ventilation speed threshold. Once the ventilation is completed, the electrical machine rotating the gas generator 12 during the ventilation phase is stopped, and the rotation speed of the gas generator 12 decreases very quickly until zero speed is reached.

The invention claimed is:

1. A method for quickly stopping a main rotor of a helicopter after landing, the helicopter comprising:
   the main rotor for propulsion of the helicopter;
   at least one turbomachine;
   a main gearbox connected between said at least one turbomachine and the main rotor;
   a turbomachine control unit;
   an electric power supply network; and
   at least one electrical machine coupled to the electrical power supply network, said at least one turbomachine including:
      a gas generator equipped with a mechanical shaft;
      a free turbine coupled to the main rotor via the main gearbox and mechanically independent of the mechanical shaft of the gas generator; and
      a system configured to mechanically couple the at least one electrical machine to the gas generator,
   wherein the method comprises, following a step of requesting a quick stop of the at least one turbomachine by a helicopter pilot, causing an extinction of a combustion chamber of the gas generator of the at least one turbomachine, the following steps managed by the turbomachine control unit of the at least one turbomachine:
      detecting an absence of a thermal stabilization phase of the gas generator of the at least one turbomachine to confirm that the step of requesting the quick stop of the at least one turbomachine is a request for quickly stopping the main rotor,
      in the event of absence of the thermal stabilization phase, maintaining the rotation of the gas generator of which the combustion chamber is extinguished, by means of said at least one electrical machine mechanically coupled to the gas generator and powered by the electrical power supply network, to ventilate the gas generator, and
      stopping the main rotor of the helicopter by means of a brake.

2. The method according to claim 1, wherein the maintaining of the rotation of the gas generator of which the combustion chamber is extinguished by means of said at least electrical machine is maintained for a predefined ventilation period starting the combustion chamber is extinguished, and a power supply of the at least one electrical machine is stopped at the end of the predefined ventilation period.

3. The method according to claim 1, wherein the maintaining of the rotation of the gas generator of which the combustion chamber is extinguished by means of said at least electrical machine is maintained as long as at least one measured temperature of the gas generator is greater than a first threshold and/or an absolute value of a measured temperature gradient is greater than a second threshold, or a power supply of the at least one electrical machine is stopped.

4. The method according to claim 1, wherein the at least one turbomachine comprises at least two turbomachines each turbomachine of the at least two turbomachines having a respective free turbine connected to the main rotor via the main gearbox, wherein the step of requesting the quick stop of the at least one turbomachine comprises requesting the quick stop of the at least two turbomachines, and wherein the turbomachine control unit is the turbomachine control unit of the at least two turbomachines, and the method also comprises, prior to the step of requesting the quick stop of the at least two turbomachines, a step of requesting operation in auxiliary power unit mode of at least one turbomachine of the at least two turbomachines driving the following steps managed by the turbomachine control unit of the at least two turbomachines:
   increasing a torque of at least one turbomachine of the at least two turbomachines until at least one other turbomachine of the at least two turbomachines supplies a zero torque to the main gearbox,
   disengaging said at least one turbomachine supplying a zero torque resulting in said at least one turbomachine supplying a zero torque being disengaged, and
   operating in auxiliary power unit mode said at least one turbomachine having been disengaged to drive the at least one electrical machine and supply power to the electrical power supply network of the helicopter,
   the step of requesting the quick stop of the at least two turbomachines by the helicopter pilot causing the extinction of the combustion chamber of the gas generator of each turbomachine of the at least two turbomachines still engaged to the main gearbox, and the step of detecting the absence of the thermal stabilization phase being applied to the gas generator of each turbomachine of the at least two turbomachines still engaged to the main gearbox.

5. The method according to claim 4, wherein the step of requesting operation in auxiliary power unit mode of at least one turbomachine of the at least two turbomachines is requested by the helicopter pilot prior to the step of requesting the quick stop of the of the at least two turbomachines, and information on the actual operation in auxiliary power unit mode of at least one turbomachine is transmitted to the helicopter pilot prior to the step of requesting the quick stop of the of the at least two turbomachines.

6. The method according to claim 1, wherein the electrical power supply network of the helicopter is configured to be power supplied by at least one alternator driven by an auxiliary power unit.

7. The method according to claim 1, wherein the electrical power supply network of the helicopter comprises at least one battery of the electrical power supply network powering said at least one electrical machine.

8. The method according to claim 2, wherein the maintaining of the rotation of the gas generator of which the combustion chamber is extinguished by means of said at least electrical machine is maintained as long as at least one measured temperature of the gas generator is greater than a first threshold and/or an absolute value of a measured temperature gradient is greater than a second threshold, or the power supply of the at least one electrical machine is stopped.

9. The method according to claim 2, wherein the at least one turbomachine comprises at least two turbomachines each turbomachine of the at least two turbomachines having a respective free turbine connected to the main rotor via the main gearbox, wherein the step of requesting the quick stop of the at least one turbomachine comprises requesting the quick stop of the at least two turbomachines, and wherein the turbomachine control unit is the turbomachine control unit of the at least two turbomachines, and the method also comprises, prior to the step of requesting the quick stop of the at least two turbomachines, a step of requesting operation in auxiliary power unit mode of at least one turbomachine of the at least two turbomachines driving the following steps managed by the turbomachine control unit of the at least two turbomachines:

increasing the torque of at least one turbomachine of the at least two turbomachines until at least one other turbomachine of the at least two turbomachines supplies a zero torque to the main gearbox, disengaging said at least one turbomachine of the at least two turbomachines supplying a zero torque resulting in said at least one turbomachine supplying a zero torque being disengaged, and operating in auxiliary power unit mode said at least one turbomachine having been disengaged to drive the at least one electrical machine and supply power to the electrical power supply network of the helicopter, the step of requesting quick stop of the at least two turbomachines by the helicopter pilot causing the extinction of the combustion chamber of the gas generator of each turbomachine of the at least two turbomachines still engaged to the main gearbox, and the step of detecting the absence of the thermal stabilization phase being applied to the gas generator of each turbomachine of the at least two turbomachines still engaged to the main gearbox.

10. The method according to claim 3, wherein the at least one turbomachine comprises at least two turbomachines each turbomachine of the at least two turbomachines having a respective free turbine connected to the main rotor via the main gearbox, wherein the step of requesting the quick stop of the at least one turbomachine comprises requesting the quick stop of the at least two turbomachines, and wherein the turbomachine control unit is the turbomachine control unit of the at least two turbomachines, and the method also comprises, prior to the step of requesting the quick stop of the at least two turbomachines, a step of requesting operation in auxiliary power unit mode of at least one turbomachine of the at least two turbomachines driving the following steps managed by the turbomachine control unit of the at least two turbomachines:

increasing a torque of at least one turbomachine of the at least two turbomachines until at least one other turbomachine of the at least two turbomachines supplies a zero torque to the main gearbox, disengaging said at least one turbomachine supplying a zero torque resulting in said at least one turbomachine supplying a zero torque being disengaged, and operating in auxiliary power unit mode said at least one turbomachine having been disengaged to drive the at least one electrical machine and supply power to the electrical power supply network of the helicopter, the step of requesting quick stop of the quick stop of the at least two turbomachines by the helicopter pilot causing the extinction of the combustion chamber of the gas generator of each turbomachine of the at least two turbomachines still engaged to the main gearbox, and the step of detecting the absence of the thermal stabilization phase being applied to the gas generator of each turbomachine of the at least two turbomachines still engaged to the main gearbox.

11. The method according to claim 2, wherein the electrical power supply network of the helicopter is configured to be power supplied by at least one alternator driven by an auxiliary power unit.

12. The method according to claim 3, wherein the electrical power supply network of the helicopter is configured to be power supplied by at least one alternator driven by an auxiliary power unit.

13. The method according to claim 4, wherein the electrical power supply network of the helicopter is configured to be power supplied by at least one alternator driven by an auxiliary power unit.

14. The method according to claim 5, wherein the electrical power supply network of the helicopter is configured to be power supplied by at least one alternator driven by an auxiliary power unit.

15. The method according to claim 2, wherein the electrical power supply network of the helicopter comprises at least one battery of the electrical power supply network powering said at least one electrical machine.

16. The method according to claim 3, wherein the electrical power supply network of the helicopter comprises at least one battery of the electrical power supply network powering said at least one electrical machine.

17. The method according to claim 4, wherein the electrical power supply network of the helicopter comprises at least one battery of the electrical power supply network powering said at least one electrical machine.

18. The method according to claim 5, wherein the electrical power supply network of the helicopter comprises at least one battery of the electrical power supply network powering said at least one electrical machine.

19. The method according to claim 6, wherein the electrical power supply network of the helicopter comprises at least one battery of the electrical power supply network powering said at least one electrical machine.

20. The method according to claim 9, wherein the step of requesting operation in auxiliary power unit mode of at least one turbomachine is requested by the helicopter pilot prior to the step of requesting the quick stop of the at least two turbomachines, and information on the actual operation in auxiliary power unit mode of at least one turbomachine is transmitted to the pilot prior to his request for quickly stopping the engine.

* * * * *